April 3, 1945. A. W. MENZIES 2,372,906
FEEDING AND REGULATING MEANS FOR MACHINE-TOOLS
Filed Jan. 31, 1944 2 Sheets-Sheet 1

Inventor
Alexander W. Menzies
by Mawhinney & Mawhinney
Attorneys

Inventor
Alexander W. Menzies
by Mawhinney & Mawhinney
Attorneys

Patented Apr. 3, 1945

2,372,906

UNITED STATES PATENT OFFICE 2,372,906

FEED AND REGULATING MEANS FOR MACHINE TOOLS

Alexander Wilson Menzies, Coventry, England, assignor to Sir W. G. Armstrong Whitworth Aircraft Limited, Coventry, England Application January 31, 1944, Serial No. 520,574
In Great Britain May 7, 1943

3 Claims. (Cl. 164—88)

This invention relates to means for feeding a strip or other elongated workpiece through a machine and carrying out successive operations on the workpiece at different predetermined distances along it. The machine may be one for spot welding, punching, or effecting other operations.

The means of the invention includes a master strip to which the workpiece can be attached and which has along it a line of holes (which may be circular or of other shape, through holes, blind holes, notches, or the like) spaced from one another in the predetermined manner. A locking member is arranged to coact with the master strip, being biassed to enter the holes and to hold the master strip stationary when engaged with a hole. Wh'lst the master strip, and, of course, the workpiece is stationary, the machine can be operated—by hand if a hand-press, for example, or, if automatically, the locking member can act on the machine control (electric switch, air valve, etc.) so as to set the machine in operation when the locking member enters a hole. A reciprocable one-way gripping device coacts with the master strip so as to grip the latter and move it forwardly when the gripping device is being moved forwardly, allowing the master strip to remain stationary when the gripping device is moved backwardly. A cam means positively reciprocates the gripping device backwardly, and spring means urge it forwardly to follow up the return movement of the cam means. A second cam means working in timed relation to the first serves for withdrawing the locking member momentarily from a hole each time the gripping device has been fully moved back.

The machine, if an automatic, may be one which completes a cycle of operations each time its control is actuated and then comes to rest, or, alternatively, it may be one in which, for example, a press plunger or welding head is moved in one direction when the machine control is actuated, the reverse movement of the plunger press or welding head being effected by a second (opposite) actuation of the machine control. With such a machine a third cam means working in timed relation to the first is provided for effecting the second actuation of the machine control, and this takes place in advance of the withdrawal of the locking member.

Figure 1:
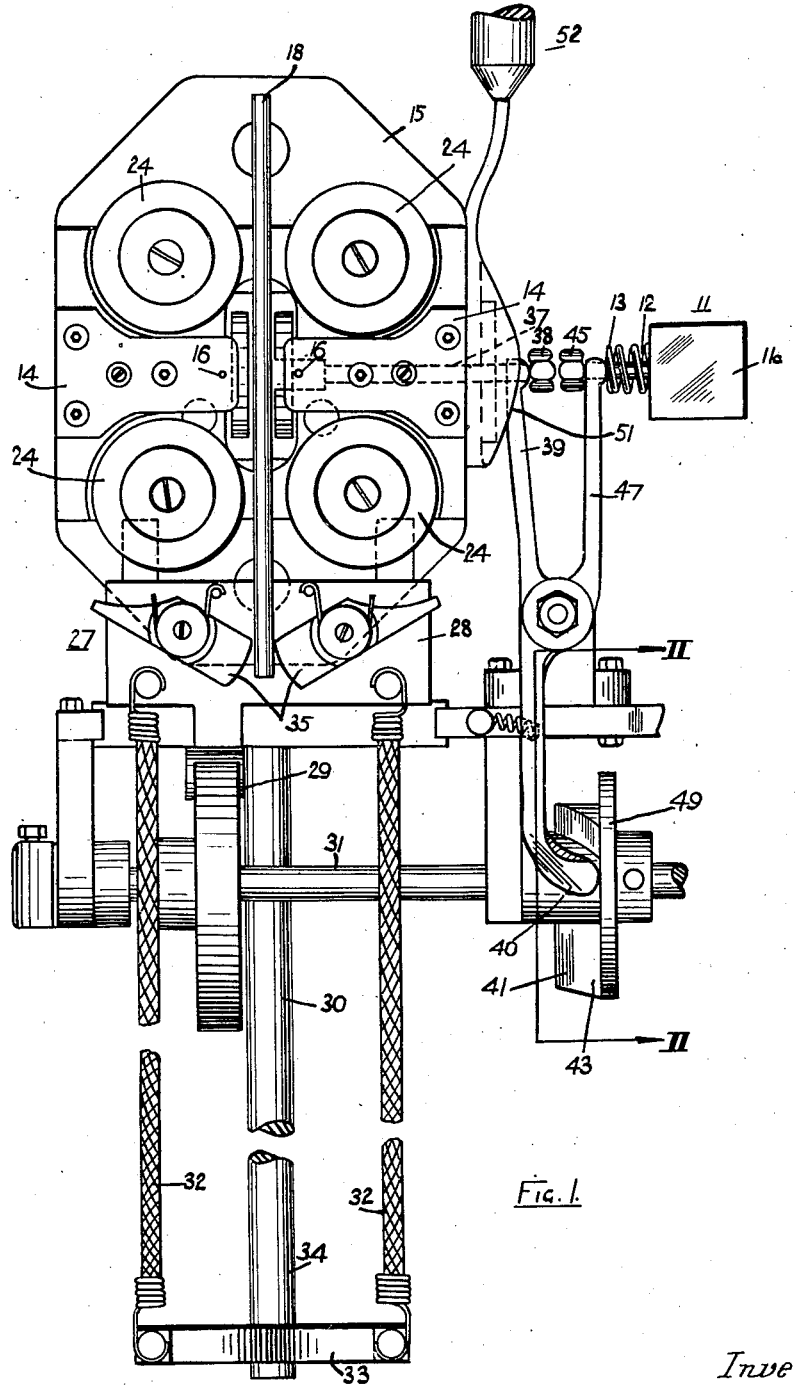
Figure 1 is a plan view of feeding and regulating means according to the invention as applied to a punching machine.

The machine shown is one of which the punch head is actuated by air pressure controlled by a two-way valve 11 of which 11a represents the casing and 12 the spindle of the movable valve element which is biassed by a compression spring 13 to the position (as shown by Figure 1) in which the punches are raised. The main air cylinder and head of the machine, which may be of any usual construction, are omitted from the drawing, which shows, however, two bottom plates 14, 14, to which the usual stripper plates will be secured, mounted upon the base 15 of the machine, the bottom plates having holes 16, 16 through which the punch tools can pass during the punching operation.

Figure 5:
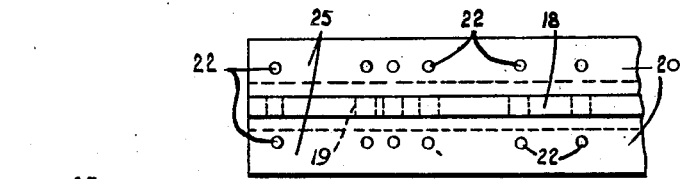
Figure 4:
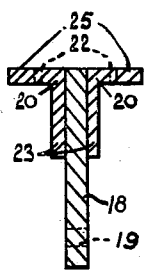
Figure 4 is a cross-section through the master strip with angle-shaped workpieces clamped against opposite faces of it, Figure 5 being a fragmentary plan and Figure 6 a fragmentary elevation thereof.
Figure 6:
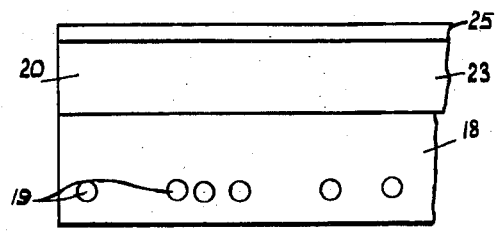

18 represents the master strip provided with a line of holes 19 (Figure 6) which, it will be observed, are disposed at different spacings from one another as desired, and in practice two similar workpieces 20 are temporarily clamped in any convenient way against opposite faces of the master strip, whilst the latter is to proceed through the machine, in order that correspondingly-spaced holes 22, 22 (Figure 5) shall be punched therein. The workpieces are omitted from Figure 1 for the sake of simplicity, but in practice their parallel flanges 23 pass between pairs of coacting rollers 24 to be guided thereby, their co-planar flanges 25 passing above the bottom plates 14, 14 and beneath the stripper blocks in a well understood manner.

The one-way gripping device 27 includes a reciprocable plate 28 which is slidingly guided in the base 15 and carries a roller 29 engaged by an eccentric cam 30 fast on a cam shaft 31 which is driven as by means of an electric motor with interposed gearing. The plate 28 is biassed in a forward direction (downward in Figure 1) to follow up the cam 30 by elastic cords 32 anchored at their remote ends on a stationary cross-piece 33 held to the base 15 by a rod 34. Figure 1 shows the plate 28 when it has advanced to the maximum extent, or, more precisely, when it has just begun to move backwardly. During backward movement of the plate 28 the spring-pressed pivotally-mounted fingers 35 rock somewhat as shown so as to climb back along the master strip 18 while the latter remains stationary. During forward movement of the plate 28, under the influence of the elastic cords 32 tending to cause the plate to follow up the movement of the cam 30, the fingers 35 grip the master strip and draw it forwardly as long as the plate is moving forwardly and the master strip is not held. Obviously other one-way gripping means, of which many forms are known, could be used instead of the fingers 35.

Coacting with the line of holes 19 in the master strip is the locking member shown in the form of a plunger pin 37 which is biased to enter a hole, the plunger terminating with a head 38 engaged as shown by one end of a lever 39. The other end 40 of the lever coacts with a cam 41 driven in timed relation with the cam 30, the cam 41 having a high surface, extending over about 50°, as shown by 42 in Figure 2.

Figure 2:
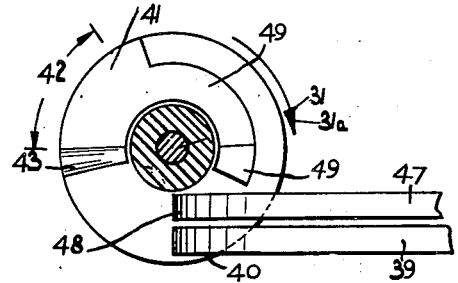
Figure 2 is an elevational view of two of the cams looking in the direction of the arrows II—II of Figure 1.

With the parts in the position shown in any of the figures the locking pin 37 is engaged with one of the holes 19 in the master strip, 18, and it will be observed from consideration of Figure 2 that the locking pin will remain thus engaged until the cam shaft 31 has travelled through 180° in the direction of the arrow 31a of Figure 2. When that has happened, the one-way gripping device will have been reciprocated fully backwardly and will just be in a position to commence its forward stroke. The cam 41 engaging the lever 39 will then retract the locking pin and will therefore allow the master strip 18 and the two workpieces to travel forward under the influence of the elastic strips 32. After quite a small further rotation of the cam shaft 31, however, the end 43 of the cam 41 reaches the lever 39, thus allowing the locking pin 37 to return to the position shown by Figure 1 provided that there is available a hole 19 into which the locking pin can enter. If no hole is available, the locking pin remains engaged with the side of the master strip whilst the latter is fully reciprocated forwardly, and it will remain so engaged until some hole becomes available. Thereupon, the locking pin immediately enters the hole to hold the master strip stationary, and it is then safe for the punching operation to be effected.

The head 38 of the locking pin coacts with a head 45 on the control rod 12 of the control valve 11, and when the locking pin 37 enters a hole the displacement of the head allows the control rod to move to the position shown in Figure 1 under the influence of the spring 13. In this position of the control valve fluid under pressure is admitted to the upper end of the main air cylinder in the known manner and the punches are forced downwardly into the holes 16 in the bottom plates to pierce a hole in each of the workpieces.

Figure 3:
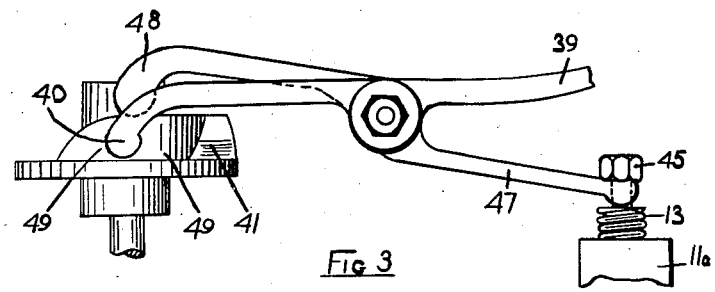
Figure 3 is a plan view of the two cams corresponding to Figure 1 but after the cams have turned through approximately 90°.

Coacting with the head 45 is a lever 47 the other end 48 of which co-operates with a cam 49 which is also driven in timed relation to the cam 30, being fast, in this instance, with the cam 41 but having its high surface extending over approximately 180° and finishing at 43 where the cam 41 finishes. Thus, when the cam 49 moves from the position shown in Figures 1 and 2 through approximately 90° to the position shown in Figure 3, the lever 47 is actuated to depress the spring 13 and to allow the control rod 12 to be moved to its other position by an internal spring (not shown). In this other position of the valve, air is admitted to the underside of the main air cylinder to cause the withdrawal of the punches in a well understood manner.

Obviously, this return operation must take place before the cam 41 engages the lever 39 to cause withdrawal of the locking pin 37.

It will also be understood that while no hole 19 is available for the locking pin 37 the head 38 of the latter engages the head 45 of the control rod 12 maintaining the control valve 11 in the last-mentioned position in which the punch head is raised. For setting up purposes a cam 51, rotatable about the axis of the locking pin 37 by a handle 52, is arranged to coact with the lever 39 so as to hold the locking pin 37 clear of the master strip, in which case the control valve 11 holds the machine head in the raised position. When turned through 90°, however, the cam 51 is clear of acting upon the lever 39 during its movements.

Thus, by means of the invention, one can arrange in a very simple manner for the automatic punching of holes in a stringer bar at different predetermined distances from one another. All that is necessary is to set out these distances accurately in the first instance on a master strip.

What I claim as my invention and desire to secure by Letters Patent of the United States is:

1. Means for feeding a strip or other elongated work piece through a machine and carrying out successive operations on the workpiece at predetermined places along it which are spaced from one another at different distances, including a master strip to which the workpiece can be attached and which has along it a line of holes spaced from one another in the predetermined manner, a locking member arranged to coact with the master strip and spring biased to hold the latter stationary when engaged with a hole (during which period the machine operation can be performed on the workpiece), a one-way gripping device which will allow the master strip to move through it only when the gripping device is moved in the back direction, cam means for positively reciprocating the gripping device backwardly, spring means urging it forwardly to follow up the return movement of the cam means, and a second cam means working in timed relation to the first and serving to withdraw the locking member momentarily each time the gripping device has been moved fully back.

2. Means for feeding a strip or other elongated workpiece through a machine and carrying out successive operations on the workpiece at different predetermined distances along it, including a master strip to which the workpiece can be attached and which has along it a line of holes spaced from one another in the predetermined manner, a locking member arranged to coact with the master strip and biassed to hold the latter stationary when engaged with a hole (during which period the machine operation can be performed on the workpiece), a one-way gripping device which will allow the master strip to move through it only when the gripping device is moved in the back direction, cam means for positively reciprocating the gripping device backwardly, spring means urging it forwardly to follow up the return movement of the cam means, a second cam means working in timed relation to the first and serving to withdraw the locking member momentarily each time the gripping device has been moved fully back, said operations being automatically effected at the requisite times by the locking member acting on the machine control to set the machine in operation when the locking member enters a hole.

3. Means for feeding a workpiece through a machine and carrying out successive operations on it at different predetermined distances along it, according to claim 3, in which the operations are automatically effected at the requisite times by the locking member acting on the machine control to set the machine in operation when the locking member enters a hole, and in which the machine control has to be actuated a second time in order that the machine may complete its cycle of operation, including a third cam means working in timed relation to the first to effect the second actuation of the machine control in advance of the withdrawal of the locking member.

ALEXANDER WILSON MENZIES.